(12) United States Patent
Ghiasi et al.

(10) Patent No.: US 12,533,161 B2
(45) Date of Patent: Jan. 27, 2026

(54) NON-RADIOLOGIC CLOSED FEMORAL REDUCTION AND NAILING WITH A WEIGHT BEARABLE NAIL FOR FEMORAL FRACTURES

(71) Applicants: Hossein Ghiasi, Tehran (IR); Seyedeh Leili Varasteh, Tehran (IR); Sina Ghiasi, Tehran (IR); Mina Ghiasi, Tehran (IR); Sajad Noorigaravand, Tehran (IR); Hamed Tayyebi, Tehran (IR); Hamid Chenari, Tehran (IR)

(72) Inventors: Hossein Ghiasi, Tehran (IR); Seyedeh Leili Varasteh, Tehran (IR); Sina Ghiasi, Tehran (IR); Mina Ghiasi, Tehran (IR); Sajad Noorigaravand, Tehran (IR); Hamed Tayyebi, Tehran (IR); Hamid Chenari, Tehran (IR)

( * ) Notice: Subject to any disclaimer, the term of this patent is extended or adjusted under 35 U.S.C. 154(b) by 396 days.

(21) Appl. No.: 18/101,657

(22) Filed: Jan. 26, 2023

(65) Prior Publication Data
US 2023/0165602 A1    Jun. 1, 2023

Related U.S. Application Data

(63) Continuation-in-part of application No. PCT/IB2021/053192, filed on Apr. 19, 2021.

(51) Int. Cl.
*A61B 17/66*    (2006.01)
*A61B 17/72*    (2006.01)

(52) U.S. Cl.
CPC .............. *A61B 17/66* (2013.01); *A61B 17/72* (2013.01)

(58) Field of Classification Search
CPC .......... A61B 17/64–6491; A61B 17/66; A61B 2017/681
See application file for complete search history.

(56) References Cited

U.S. PATENT DOCUMENTS

| 4,312,336 | A | * | 1/1982 | Danieletto | A61B 17/66 |
|---|---|---|---|---|---|
| | | | | | 403/56 |
| 4,365,624 | A | * | 12/1982 | Jaquet | A61B 17/6441 |
| | | | | | 606/56 |
| 4,475,546 | A | * | 10/1984 | Patton | A61B 17/6466 |
| | | | | | 403/56 |
| 4,848,368 | A | * | 7/1989 | Kronner | A61B 17/66 |
| | | | | | 606/57 |
| 5,454,810 | A | * | 10/1995 | Pohl | A61B 17/6491 |
| | | | | | 606/54 |

(Continued)

*Primary Examiner* — Eduardo C Robert
*Assistant Examiner* — Steven J Cotroneo

(57) ABSTRACT

A reduction and fixation device and a method for non-radiologic closed reduction and nailing with a weight bearable nail for femoral fractures. The reduction and fixation device includes a proximal trifurcation device, a distal trifurcation device, a length adjusting nut, and an alignment rod. The proximal trifurcation device is configured to be attached and secured to a proximal fragment of a fractured femur of a patient. The distal trifurcation device is configured to be attached and secured to a distal fragment of the fractured femur of the patient. The proximal trifurcation device, the distal trifurcation device, the length adjusting nut, and the alignment rod are configured to manipulate a proximal fragment and a distal fragment of a fractured femur to restore their alignment and orientation to a pre-fracture state.

9 Claims, 19 Drawing Sheets

(56) References Cited

U.S. PATENT DOCUMENTS

| | | | | |
|---|---|---|---|---|
| 5,643,258 | A | * | 7/1997 | Robioneck ............. A61B 17/60 606/68 |
| 2004/0097922 | A1 | * | 5/2004 | Mullaney ........... A61B 17/6458 606/53 |
| 2004/0102787 | A1 | * | 5/2004 | Bimman ............ A61B 17/1717 606/96 |
| 2014/0025076 | A1 | * | 1/2014 | Lee, Jr. ............... A61B 17/6466 606/59 |
| 2017/0119436 | A1 | * | 5/2017 | Farzadfard ............. A61B 17/66 |
| 2018/0228515 | A1 | * | 8/2018 | Ross .................. A61B 17/6491 |
| 2018/0271507 | A1 | * | 9/2018 | Gasser ................. A61B 17/683 |
| 2018/0368887 | A1 | * | 12/2018 | Lauf ...................... A61B 17/62 |
| 2020/0146733 | A1 | * | 5/2020 | Vicenzi ............. A61B 17/1717 |

\* cited by examiner

126

600

600

800

800

800

800

NON-RADIOLOGIC CLOSED FEMORAL REDUCTION AND NAILING WITH A WEIGHT BEARABLE NAIL FOR FEMORAL FRACTURES

CROSS-REFERENCE TO RELATED APPLICATION

This application is a continuation-in-part of International Patent Application PCT/IB2021/053192, filed on Apr. 19, 2021, and entitled "NON-RADIOLOGIC CLOSED FEMORAL REDUCTION AND NAILING WITH A WEIGHT BEARABLE NAIL FOR FEMORAL FRACTURES," which is incorporated herein by reference in its entirety.

TECHNICAL FIELD

The present disclosure generally relates to orthopedic devices, and more particularly relates to a device for femur fracture closed reduction and fixation and a method for closed femoral reduction and fixation and nailing with a weight wearable nail without using a fluoroscopy set and X-ray.

BACKGROUND ART

Closed reduction is a procedure to set (reduce) a broken/fractured bone, such as a broken/fractured femur, without cutting the skin open. The broken/fractured bone may be put back in place which may allow the fractured bone to grow back together. Closed reduction may work best when it is done as soon as possible after the bone breaks. A closed reduction may be implemented by an orthopedic surgeon, emergency room physician, or a primary care provider.

When a bone breaks, it may be divided into two or more fragments. The fragments may lose their alignment in the form of displacement or angulation. In order to heal a fractured bone properly, the fragments may be realigned to their normal anatomical position and then the reduced fracture may be fixed. In order to stabilize the reduced fractured bone, enable fast healing of the injured bone and return early mobility and full function of the injured extremity, fracture fixation may be carried out.

In closed reduction methods for a femur fracture, femur fragments may be indirectly manipulated by different methods, such as, traction of the whole thigh on a fracture table or using hanging weights; or distraction of bone fragments indirectly using mechanical distractors attached to the femur fragments by some drilled pins through the skin far from the fracture site. In closed reduction, the fixation may be implemented by methods such as intramedullary fixation using intramedullary nailing, in which, the integrity of the fracture site soft tissue may be preserved which may lead to some advantages in terms of cosmetics, blood loss, and rate of union, time of surgery, rehabilitation and medical costs.

After that a femur fracture is reduced, internal splinting may be done by intramedullary nails that may be inserted into the bone medulla from one end of the fractured femur far from the fracture site. In this method, one end of the femur medullary canal may be opened and a guide wire may be passed through the bone which may fix and align the femur fragments in the required position. This may be considered as one of the critical stages of intramedullary nailing of the femur. Closed nailing method may be used for treatment of femur fractures. In this method, a fracture table for fastening the patient, a fluoroscopy set, and devices for femur manipulation to achieve femur reduction may be needed.

In spite of all the devices and facilities used in closed nailing method, the method may be time-consuming since it may take a long time to pass the guide wire through the medullary canal as the initiating critical step of the surgery. Furthermore, frequent exposure of X-ray radiation to the patient and the surgeon may be harmful. For example, it is proved that frequent exposure to X-ray radiation may increase risk of different cancers. Therefore, there is a need for orthopedic devices that are able to realign bone fragments to their normal anatomical position and fix them quickly and without a need to X-ray radiation and fluoroscopy set.

SUMMARY OF THE DISCLOSURE

This summary is intended to provide an overview of the subject matter of the present disclosure, and is not intended to identify essential elements or key elements of the subject matter, nor is it intended to be used to determine the scope of the claimed implementations. The proper scope of the present disclosure may be ascertained from the claims set forth below in view of the detailed description below and the drawings.

According to one or more exemplary embodiments of the present disclosure, a reduction and fixation device for treating femoral shaft fracture is disclosed. In an exemplary embodiment, the reduction and fixation device may include a proximal trifurcation device, a distal trifurcation device, a length adjusting nut, and an alignment rod. In an exemplary embodiment, the proximal trifurcation device may be configured to be attached and secured to a proximal fragment of a fractured femur of an exemplary patient. In an exemplary embodiment, the proximal trifurcation device may include a proximal arm, a proximal rod, a proximal traction arm, and a proximal alignment arm.

In an exemplary embodiment, the proximal arm may be configured to be attached and secured to the proximal fragment of the fractured femur. In an exemplary embodiment, a first end of the proximal rod may be attached to a distal end of the proximal arm. In an exemplary embodiment, a main longitudinal axis of the proximal rod may be perpendicular to a main longitudinal axis of the proximal arm. In an exemplary embodiment, a second end of the proximal rod may be configured to be inserted and secured into a proximal medullary cavity of the proximal fragment.

In an exemplary embodiment, a proximal traction arm may be configured to be fixedly attached and secured to the proximal fragment by utilizing a first pair of connecting screws. In an exemplary embodiment, a main longitudinal axis of the proximal traction arm may be parallel to the main longitudinal axis of the proximal rod. In an exemplary embodiment, a proximal end of the proximal traction arm may be attached to a proximal end of the proximal arm. In an exemplary embodiment, the proximal traction arm may include a rod receiving hole at a distal end of the proximal traction arm. In an exemplary embodiment, a main longitudinal axis of the rod receiving hole may coincide the main longitudinal axis of the proximal traction arm.

In an exemplary embodiment, a proximal traction arm may be configured to be fixedly attached and secured to the proximal fragment by utilizing a first pair of connecting screws. In an exemplary embodiment, a main longitudinal axis of the proximal traction arm may be parallel to the main longitudinal axis of the proximal rod. In an exemplary embodiment, a proximal end of the proximal traction arm may be attached to a proximal end of the proximal arm. In an exemplary embodiment, the proximal traction arm may include a rod receiving hole at a distal end of the proximal traction arm. In an exemplary embodiment, a main longitudinal axis of the rod receiving hole may coincide the main longitudinal axis of the proximal traction arm.

In an exemplary embodiment, the distal trifurcation device may be configured to be attached and secured to a distal fragment of the fractured femur of the patient. In an exemplary embodiment, the distal trifurcation device may include a distal arm, a distal rod, a distal traction arm, and a distal alignment arm.

In an exemplary embodiment, a first end of the distal rod may be attached to a distal end of the distal arm. In an exemplary embodiment, a main longitudinal axis of the distal rod may be perpendicular to a main longitudinal axis of the distal arm. In an exemplary embodiment, a second end of the distal rod may be configured to be inserted and secured into a distal medullary cavity of the distal fragment.

In an exemplary embodiment, a distal traction arm may be associated with the proximal traction arm. In an exemplary embodiment, the distal traction arm may be configured to be fixedly attached and secured to the distal fragment by utilizing a second pair of connecting screws. In an exemplary embodiment, a main longitudinal axis of the distal traction arm may be parallel to the main longitudinal axis of the distal rod. In an exemplary embodiment, a proximal end of the distal traction arm may be attached to a proximal end of the distal arm. In an exemplary embodiment, the distal traction arm may include an externally threaded section on an outer surface of the distal traction arm and at a distal end of the distal traction arm.

In an exemplary embodiment, the distal end of the distal traction arm may be configured to be inserted into the rod receiving hole. In an exemplary embodiment, an outer diameter of the distal traction arm may correspond to an inner diameter of the rod receiving hole. In an exemplary embodiment, the distal traction arm and the rod receiving hole may be configured to align the main longitudinal axis of the distal traction arm with the main longitudinal axis of the rod receiving hole responsive to the distal end of the distal traction arm being inserted into the rod receiving hole.

In an exemplary embodiment, a proximal end of the distal alignment arm may be attached to the proximal end of the distal arm. In an exemplary embodiment, the proximal end of the distal alignment arm may be attached to the proximal end of the distal traction arm. In an exemplary embodiment, a main longitudinal axis of the distal alignment arm may be perpendicular to the main longitudinal axis of the distal rod. In an exemplary embodiment, the main longitudinal axis of the distal alignment arm may be perpendicular to the main longitudinal axis of the distal traction arm. In an exemplary embodiment, the distal alignment arm may include a distal alignment hole at a distal end of the distal alignment arm. In an exemplary embodiment, the distal alignment hole may be associated with the proximal alignment hole.

In an exemplary embodiment, the length adjusting nut may be mounted onto the distal end of the proximal traction arm. In an exemplary embodiment, the length adjusting nut may be associated with the externally threaded section. In an exemplary embodiment, the length adjusting nut may include an internally threaded section. In an exemplary embodiment, the internally threaded section of the length adjusting nut may be configured to be engaged with the externally threaded section of the distal traction arm.

In an exemplary embodiment, the length adjusting nut may be configured to urge the distal traction arm to move into the rod receiving hole responsive to twisting the length adjusting nut in a first rotational direction. In an exemplary embodiment, the length adjusting nut may further be configured to urge the distal traction arm to move out from the rod receiving hole responsive to twisting the length adjusting nut in a second rotational direction.

In an exemplary embodiment, the alignment rod may be associated with the proximal alignment hole and the distal alignment hole. In an exemplary embodiment, a first end of the alignment rod may be configured to be inserted into the proximal alignment hole. In an exemplary embodiment, a second end of the alignment rod may be configured to be inserted into the distal alignment hole. In an exemplary embodiment, the alignment rod may be configured to make the main longitudinal axis of the proximal alignment arm and the main longitudinal axis of the distal alignment arm parallel to each other responsive to the alignment rod being inserted into the proximal alignment hole and the distal alignment hole.

In an exemplary embodiment, a first distance between the main longitudinal axis of the proximal rod and the main longitudinal axis of the proximal traction arm may be equal to a second distance between the main longitudinal axis of the distal rod and the main longitudinal axis of the distal traction arm.

In an exemplary embodiment, a first cross-section of the proximal alignment hole may include a first polygon. In an exemplary embodiment, a second cross-section of the distal alignment hole may include a second polygon. In an exemplary embodiment, a shape of the first polygon may be the same as a shape of the second polygon. In an exemplary embodiment, a size of the first polygon may be the same as a size of the second polygon. In an exemplary embodiment, a third cross-section of the alignment rod may include a third polygon. In an exemplary embodiment, a shape of the third polygon may be the same as the shape of the first polygon and the shape of the second polygon. In an exemplary embodiment, a size of the third polygon may be the same as the size of the first polygon and the size of the second polygon.

In an exemplary embodiment, a main longitudinal axis of the proximal alignment hole may be parallel to the main longitudinal axis of the proximal traction arm. In an exemplary embodiment, a main longitudinal axis of the distal alignment hole may be parallel to the main longitudinal axis of the distal traction arm. In an exemplary embodiment, a third distance between the main longitudinal axis of the proximal alignment hole and the main longitudinal axis of the proximal traction arm may be equal to a fourth distance between the main longitudinal axis of the distal alignment hole and the main longitudinal axis of the distal traction arm.

In an exemplary embodiment, each of the first polygon, the second polygon, and the third polygon comprises a triangular shape. In an exemplary embodiment, the first pair of connecting screws may include a first connecting screw and a second connecting screw. In an exemplary embodiment, the first connecting screw and the second connecting screw may be configured to fixedly attach and secure the proximal traction arm laterally to the proximal fragment. In an exemplary embodiment, the second pair of connecting screws may include a third connecting screw and a fourth connecting screw. In an exemplary embodiment, the third connecting screw and the fourth connecting screw may be configured to attach and secure the distal traction arm laterally to the distal fragment.

In an exemplary embodiment, the disclosed device may further include a first connecting hole on the proximal traction arm. In an exemplary embodiment, a main longitudinal axis of the first connecting hole may be parallel to the main longitudinal axis of the proximal arm. In an exemplary embodiment, the first connecting hole may be configured to receive the first connecting screw. In an exemplary embodiment, the first connecting screw may be configured to attach and secure the proximal traction arm laterally to the proximal fragment responsive to inserting the first connecting screw into the first connecting hole and screwing the first connecting screw to the proximal fragment.

In an exemplary embodiment, the disclosed device may further include a second connecting hole on the proximal traction arm. In an exemplary embodiment, a main longitudinal axis of the second connecting hole may be parallel to the main longitudinal axis of the proximal arm. In an exemplary embodiment, the second connecting hole may be configured to receive the second connecting screw. In an exemplary embodiment, the second connecting screw may be configured to attach and secure the proximal traction arm laterally to the proximal fragment responsive to inserting the second connecting screw into the second connecting hole and screwing the second connecting screw to the proximal fragment.

In an exemplary embodiment, the disclosed device may include a third connecting hole on the distal traction arm. In an exemplary embodiment, a main longitudinal axis of the third connecting hole may be parallel to the main longitudinal axis of the distal arm. In an exemplary embodiment, the third connecting hole may be configured to receive the third connecting screw. In an exemplary embodiment, the third connecting screw may be configured to attach and secure the distal traction arm laterally to the distal fragment responsive to inserting the third connecting screw into the third connecting hole and screwing the third connecting screw to the distal fragment.

In an exemplary embodiment, the disclosed device may further include a fourth connecting hole on the distal traction arm. In an exemplary embodiment, a main longitudinal axis of the fourth connecting hole may be parallel to the main longitudinal axis of the distal arm. In an exemplary embodiment, the fourth connecting hole may be configured to receive the fourth connecting screw. In an exemplary embodiment, the fourth connecting screw may be configured to attach and secure the distal traction arm laterally to the distal fragment responsive to inserting the fourth connecting screw into the fourth connecting hole and screwing the fourth connecting screw to the distal fragment.

In an exemplary embodiment, the proximal rod may be detachably attached to the distal end of the proximal arm. In an exemplary embodiment, the proximal arm may include a proximal rod receiving hole at the distal end of the proximal arm. In an exemplary embodiment, a main longitudinal axis of the proximal rod receiving hole may be parallel to the main longitudinal axis of the proximal traction arm. In an exemplary embodiment, the proximal rod receiving hole may be configured to receive the first end of the proximal rod.

In an exemplary embodiment, the distal rod may be detachably attached to the distal end of the distal arm. In an exemplary embodiment, the distal arm may include a distal rod receiving hole at the distal end of the distal arm. In an exemplary embodiment, a main longitudinal axis of the distal rod receiving hole may be parallel to the main longitudinal axis of the distal traction arm. In an exemplary embodiment, the distal rod receiving hole may be configured to receive the first end of the distal rod.

According to one or more exemplary embodiments of the present disclosure, a method for fracture reduction in a fractured femur of a patient is disclosed. In an exemplary embodiment, the fractured femur of the patient may include a proximal fragment at a proximal end of the fractured femur and a distal fragment at a distal end of the fractured femur. In an exemplary embodiment, the method may include opening the proximal end of the fractured femur and the distal end of the fractured femur, attaching a distal end of a proximal arm to a first end of a proximal rod, a main longitudinal axis of the proximal arm perpendicular to a main longitudinal axis of the proximal rod, attaching a distal end of a distal arm to a first end of a distal rod, a main longitudinal axis of the distal arm perpendicular to a main longitudinal axis of the distal rod, and inserting a second end of the proximal rod into a proximal medullary cavity of the proximal fragment.

In an exemplary embodiment, the method may further include inserting a second end of the distal rod into a distal medullary cavity of the distal fragment, attaching a proximal end of a proximal traction arm to a proximal end of the proximal arm, attaching a proximal end of a distal traction arm to a proximal end of the distal arm, a main longitudinal axis of the distal traction arm perpendicular to the main longitudinal axis of the distal arm, attaching a proximal end of a proximal alignment arm to the proximal end of the proximal arm and the proximal end of the proximal traction arm, and attaching a proximal end of a distal alignment arm to the proximal end of the distal arm and the proximal end of the distal traction arm.

In an exemplary embodiment, the method may further include displacing the proximal fragment to a pre-fracture state of the proximal fragment by applying an outward force to the proximal traction arm along a force axis, securing the proximal traction arm to the proximal fragment by utilizing a first pair of screws, securing the distal traction arm to the distal fragment by utilizing a second pair of screws, inserting the distal end of the distal traction arm into the rod receiving hole, engaging the externally threaded section of the distal traction arm with an internally threaded section of a length adjusting nut, and adjusting a length of the fractured femur to a predetermined length by twisting the length adjusting nut in a first rotational direction.

In an exemplary embodiment, the method may further include aligning the proximal medullary cavity of the proximal fragment with the distal medullary cavity of the distal fragment, aligning the proximal medullary cavity of the proximal fragment with the distal medullary cavity of the distal fragment, adjusting a length of the fractured femur to a pre-fracture length of the fractured femur by twisting the length adjusting nut in a second rotational direction, removing the proximal rod from the proximal medullary cavity of the proximal fragment, and inserting an intramedullary nail into the proximal medullary cavity and the distal medullary cavity by inserting the nail into the proximal end of the fractured femur.

BRIEF DESCRIPTION OF THE DRAWINGS

The drawing figures depict one or more implementations in accord with the present teachings, by way of example only, not by way of limitation. In the figures, like reference numerals refer to the same or similar elements.

DESCRIPTION OF EMBODIMENTS

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The following detailed description is presented to enable a person skilled in the art to make and use the methods and devices disclosed in exemplary embodiments of the present disclosure. For purposes of explanation, specific nomenclature is set forth to provide a thorough understanding of the present disclosure. However, it will be apparent to one skilled in the art that these specific details are not required to practice the disclosed exemplary embodiments. Descriptions of specific exemplary embodiments are provided only as representative examples. Various modifications to the exemplary implementations will be readily apparent to one skilled in the art, and the general principles defined herein may be applied to other implementations and applications without departing from the scope of the present disclosure. The present disclosure is not intended to be limited to the implementations shown, but is to be accorded the widest possible scope consistent with the principles and features disclosed herein.

The present disclosure is directed to exemplary embodiments of a reduction and fixation device and a method for fracture reduction in a fractured femur of an exemplary patient. An exemplary reduction and fixation device may include a proximal trifurcation device which may be attached and secured to a proximal fragment of a fractured femur of an exemplary patient. The proximal trifurcation device may include a proximal arm, a proximal rod, a proximal traction arm, and a proximal alignment arm. The reduction and fixation device may also include a distal trifurcation device which may be attached and secured to a distal fragment of the fractured femur of an exemplary patient. The distal trifurcation device may include a distal arm, a distal rod, a distal traction arm, and a distal alignment arm. The reduction and fixation device may also include a length adjusting nut mounted onto the distal end of the proximal traction arm and an alignment rod. By utilizing an exemplary reduction and fixation device, an exemplary surgeon may be able to realign the proximal fragment and the distal fragment of a fractured femur to a desired anatomical position without the need for a fluoroscopy set. Hence, by utilizing an exemplary device and method, an exemplary surgeon may heal a fractured femur without any deformity while avoiding the exposure of X-ray radiation to an exemplary patient and staff.

Figure 1A:
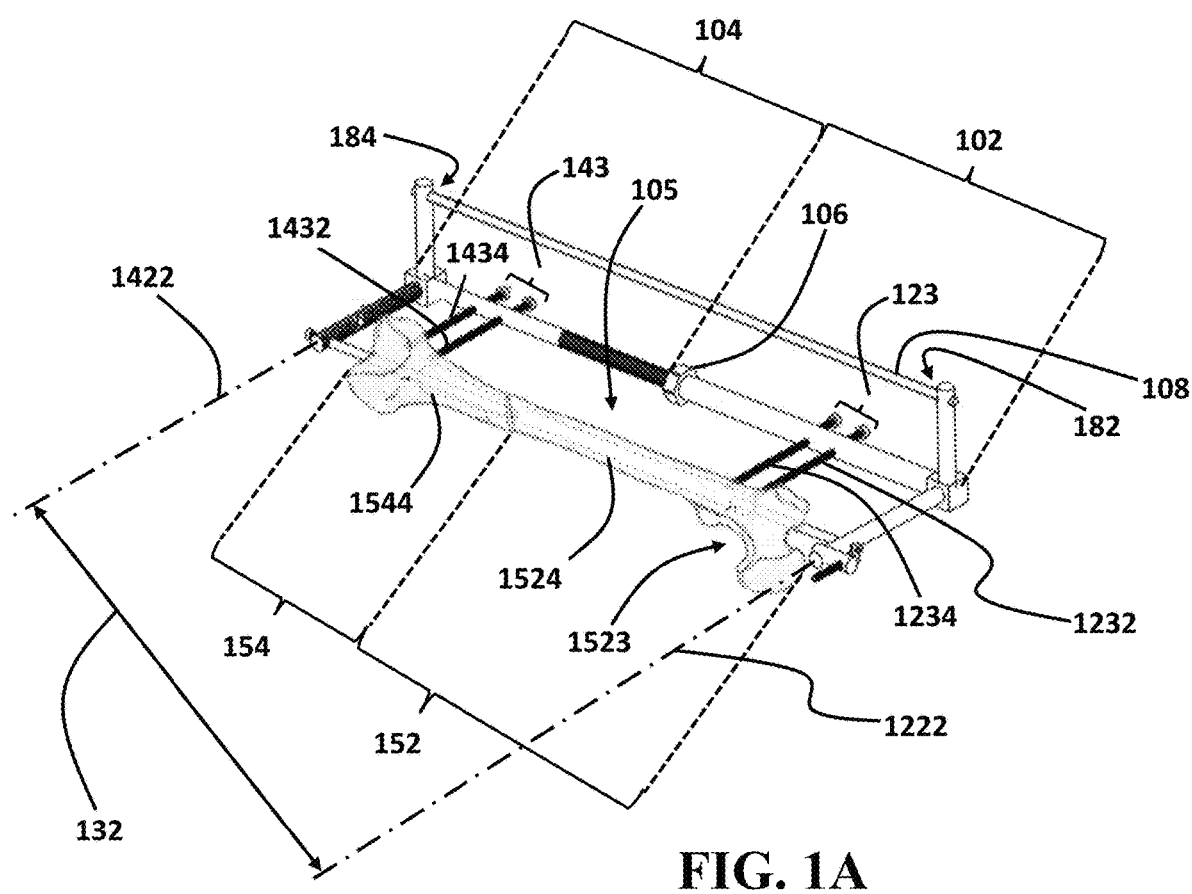
FIG. 1A illustrates a perspective view of a reduction and fixation device, consistent with one or more exemplary embodiments of the present disclosure.
Figure 1B:
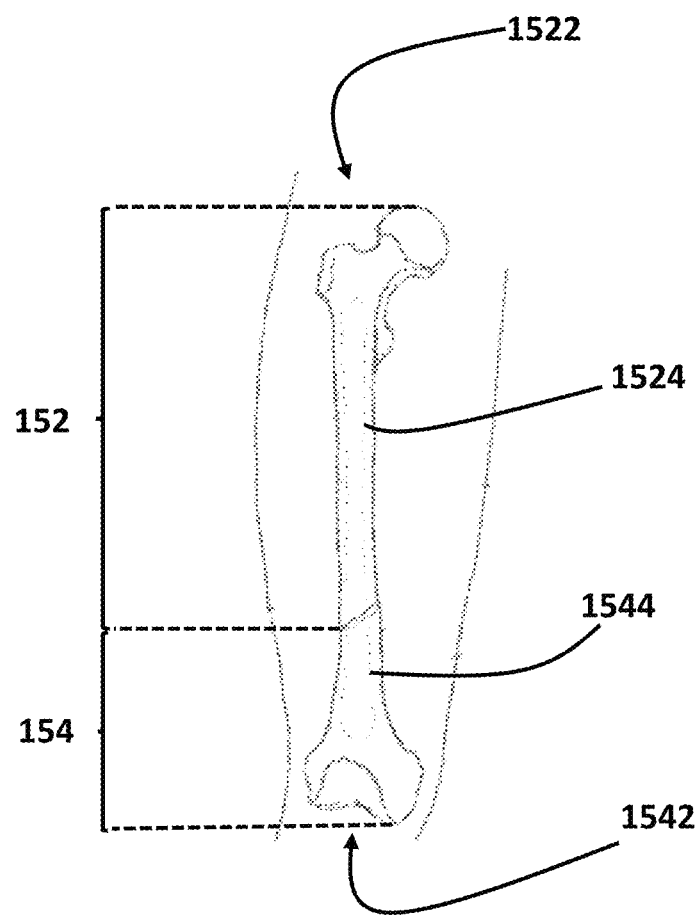
FIG. 1B illustrates a fractured femur of an exemplary patient, consistent with one or more exemplary embodiments of the present disclosure.
Figure 2A:
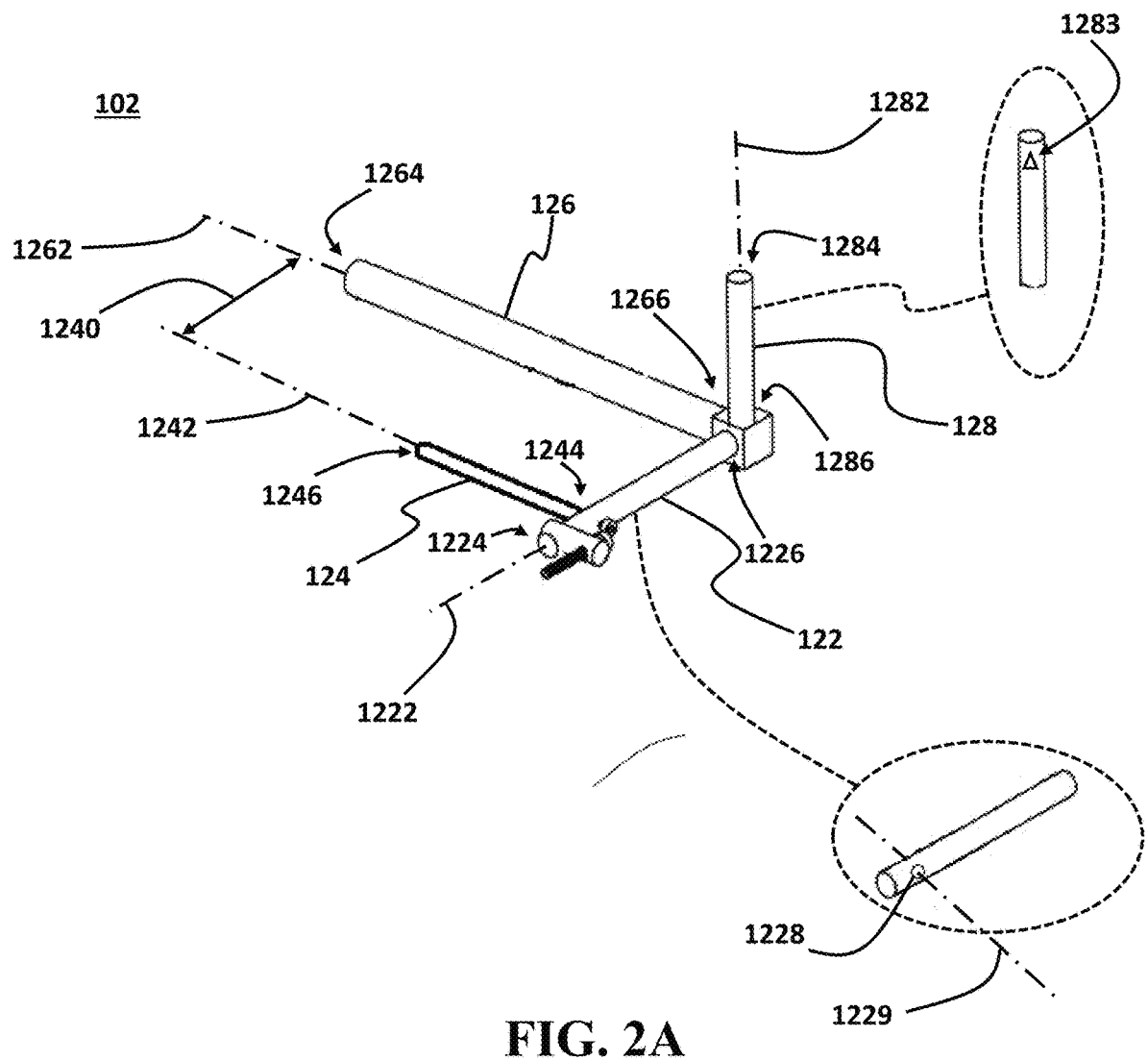
FIG. 2A illustrates a perspective view of a proximal trifurcation device, consistent with one or more exemplary embodiments of the present disclosure.

FIG. 1A shows a perspective view of a reduction and fixation device 100, consistent with one or more exemplary embodiments of the present disclosure. As shown in FIG. A, in an exemplary embodiment, reduction and fixation device 100 may include a proximal trifurcation device 102, a distal trifurcation device 104, a length adjusting nut 106, and an alignment rod 108. FIG. 1B shows a fractured femur 105 of an exemplary patient, consistent with one or more exemplary embodiments of the present disclosure. In an exemplary embodiment, fractured femur 105 may represent one exemplary scenario of a fractured femur of an exemplary patient. The principles disclosed within context of fractured femur 105 may be applicable to other fractured femurs. FIG. 2A shows a perspective view of proximal trifurcation device 102, consistent with one or more exemplary embodiments of the present disclosure. As shown in FIG. 1A, in an exemplary embodiment, proximal trifurcation device 102 may be configured to be attached and secured to a proximal fragment 152 of fractured femur 105 of a patient. As shown in FIG. 2A, in an exemplary embodiment, proximal trifurcation device 102 may include a proximal arm 122, a proximal rod 124, a proximal traction arm 126, and a proximal alignment arm 128. In an exemplary embodiment, proximal arm 122 may be configured to be attached and secured to proximal fragment 152 of fractured femur 105 of the patient.

In an exemplary embodiment, a first end 1244 of proximal rod 124 may be attached to a distal end 1224 of proximal arm 122. In an exemplary embodiment, first end 1244 of proximal rod 124 may be attached to distal end 1224 of proximal arm 122 in such a way that a main longitudinal axis 1242 of proximal rod 124 is perpendicular to a main longitudinal axis 1222 of proximal arm 122. In an exemplary embodiment, a second end 1246 of proximal rod 124 may be configured to be inserted and secured into a proximal medullary cavity 1524 of proximal fragment 152. In an exemplary embodiment, an outer diameter of second end 1246 of proximal rod 124 may correspond to an inner diameter of proximal medullary cavity 1524 of proximal fragment 152 so that when second end 1246 of proximal rod 124 is inserted into proximal medullary cavity 1524 of proximal fragment 152, proximal rod 124 may be secured into proximal medullary cavity 1524 of proximal fragment 152. In an exemplary embodiment, proximal rod 124 may be a cannulated screw. In an exemplary embodiment, proximal rod 124 may be configured to be coaxially inserted and secured into a proximal medullary cavity 1524 of proximal fragment 152. In an exemplary embodiment, when proximal rod 124 is coaxially inserted into proximal medullary cavity 1524 of proximal fragment 152, it may mean that proximal rod 124 is inserted into proximal medullary cavity 1524 of proximal fragment 152 in such a way that a main longitudinal axis 1242 of proximal rod 124 is aligned with a main longitudinal axis of proximal medullary cavity 1524 of proximal fragment 152. In an exemplary embodiment, an exemplary surgeon may first insert second end 1246 of proximal rod 124 into proximal medullary cavity 1524 of proximal fragment 152 and then attach first end 1244 of proximal rod 124 to distal end 1224 of proximal arm 122. In an exemplary embodiment, proximal rod 124 may be detachably attached to distal end 1224 of proximal arm 122. In an exemplary embodiment, when, proximal rod 124 is detachably attached to distal end 1224 of proximal arm 122, it may mean that proximal rod 124 is attached to distal end 1224 of proximal arm 122 in such a way that proximal rod 124 may be detached from distal end 1224 of proximal arm 122. In an exemplary embodiment, proximal arm 122 may include a proximal rod receiving hole 1228 at distal end 1224 of proximal arm 122. In an exemplary embodiment, a main longitudinal axis 1229 of proximal rod receiving hole 1228 may be perpendicular to main longitudinal axis 1222 of proximal arm 122. In an exemplary embodiment, proximal rod receiving hole 1228 may be configured to receive first end 1244 of proximal rod 124.

Figure 2B:
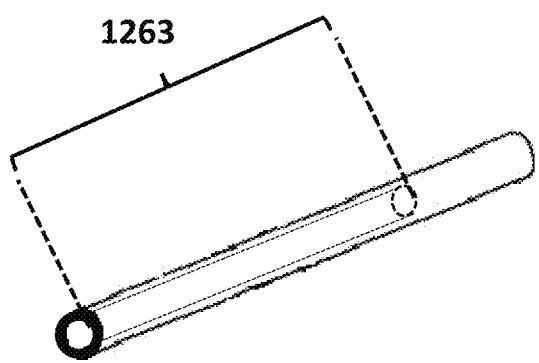
FIG. 2B illustrates a perspective view of a proximal traction arm, consistent with one or more exemplary embodiments of the present disclosure.

In an exemplary embodiment, proximal traction arm 126 may be configured to be fixedly attached and secured to proximal fragment 152 of fractured femur 105. In an exemplary embodiment, when proximal traction arm 126 is fixedly attached to proximal fragment 152 of fractured femur 105, it may mean that proximal traction arm 126 is attached to proximal fragment 152 of fractured femur 105 in such a way that any movement between proximal traction arm 126 and proximal fragment 152 of fractured femur 105 is prevented. In an exemplary embodiment, proximal traction arm 126 may be fixedly attached and secured to proximal fragment 152 of fractured femur 105 by utilizing a first pair of connecting screws 123. In an exemplary embodiment, first pair of connecting screws 123 may be screwed into a lateral cortex of proximal fragment 152 of fractured femur 105. In an exemplary embodiment, first pair of connecting screws 123 may include a first connecting screw 1232 and a second connecting screw 1234. In an exemplary embodiment, first connecting screw 1232 may be inserted into a first connecting hole on proximal traction arm 126 and then screwed into proximal fragment 152. In an exemplary embodiment, second connecting screw 1234 may be inserted into a second connecting hole on proximal traction arm 126 and then screwed into proximal fragment 152. In an exemplary embodiment, a main longitudinal axis 1262 of proximal traction arm 126 may be parallel to main longitudinal axis 1242 of proximal rod 124. In an exemplary embodiment, a proximal end 1266 of proximal traction arm 126 may be attached to a proximal end 1226 of proximal arm 122. FIG. 2B shows a perspective view of proximal traction arm 126, consistent with one or more exemplary embodiments of the present disclosure.

As shown in FIG. 2B, in an exemplary embodiment, proximal traction arm 126 may include a rod receiving hole 1263 at a distal end 1264 of proximal traction arm 126. In an exemplary embodiment, a main longitudinal axis of rod receiving hole 1263 may coincide main longitudinal axis 1262 of proximal traction arm 126.

Referring back to FIG. 2A, in an exemplary embodiment, a proximal end 1286 of proximal alignment arm 128 may be attached to proximal end 1226 of proximal arm 122 and proximal end 1266 of proximal traction arm 126. In an exemplary embodiment, a main longitudinal axis 1282 of proximal alignment arm 128 may be perpendicular to main longitudinal axis 1222 of proximal arm 122 and main longitudinal axis 1262 of proximal traction arm 126. In an exemplary embodiment, proximal alignment arm 128 may include a proximal alignment hole 1283 at a distal end 1284 of proximal alignment arm 128. In an exemplary embodiment, proximal alignment hole 1283 may include a polygonal cross-section. In an exemplary embodiment, proximal alignment hole 1283 may include a triangular cross-section.

Figure 3:
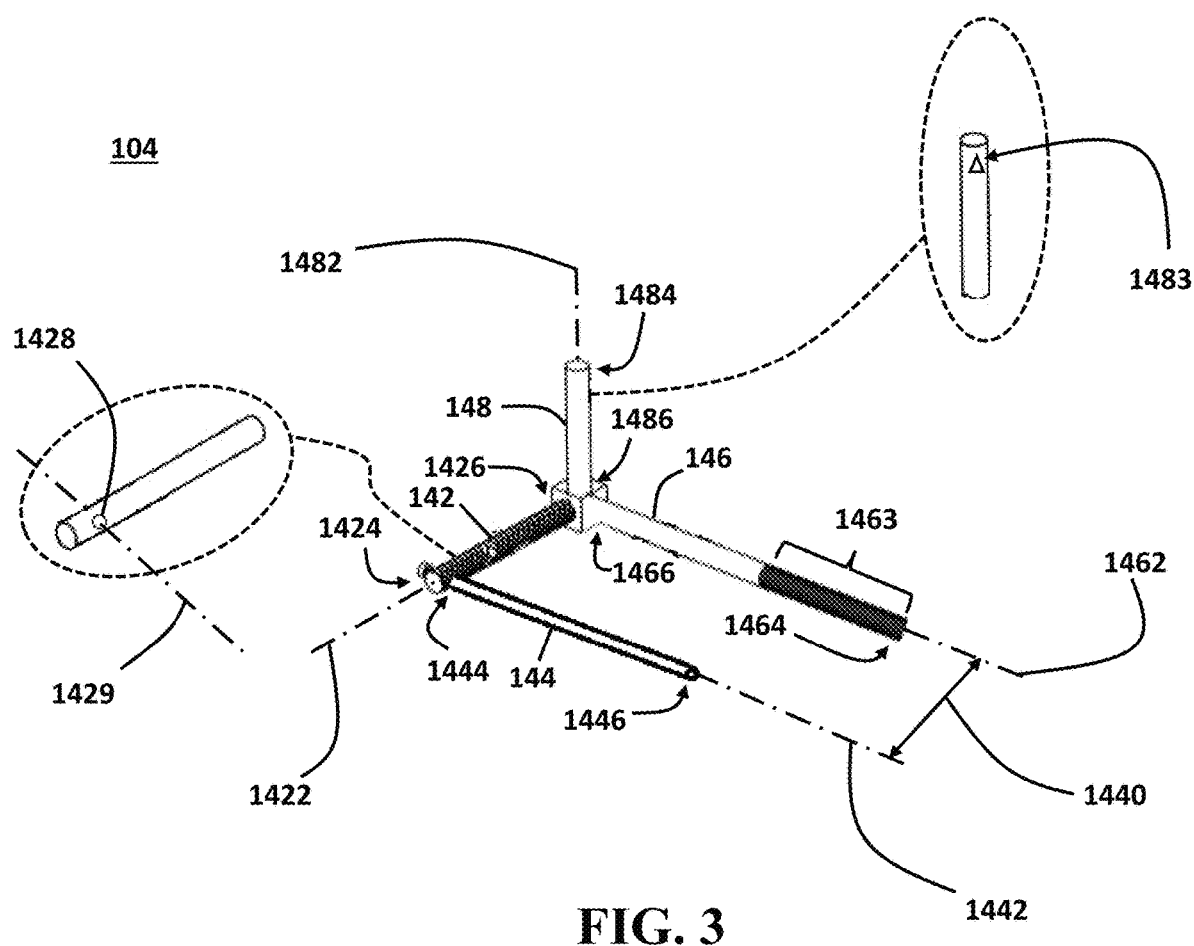
FIG. 3 illustrates a perspective view of a distal trifurcation device, consistent with one or more exemplary embodiment of the present disclosure.

FIG. 3 shows a perspective view of distal trifurcation device 104, consistent with one or more exemplary embodiment of the present disclosure. As shown in FIG. 3, in an exemplary embodiment, distal trifurcation device 104 may be configured to be attached and secured to distal fragment 154 of fractured femur 105 of the patient. As further shown in FIG. 3, in an exemplary embodiment, distal trifurcation device 104 may include a distal arm 142, a distal rod 144, a distal traction arm 146, and a distal alignment arm 148. In an exemplary embodiment, distal trifurcation device 104 may be configured to be attached and secured to distal fragment 154 of fractured femur 105 of the patient through attaching and securing distal traction arm 146 and distal rod 144 to distal fragment 154 of fractured femur 105 of the patient.

In an exemplary embodiment, a first end 1444 of distal rod 144 may be attached to a distal end 1424 of distal arm 142. In an exemplary embodiment, first end 1444 of distal rod 144 may be attached to distal end 1424 of distal arm 142 in such a way that a main longitudinal axis 1442 of distal rod 144 is perpendicular to a main longitudinal axis 1422 of distal arm 142. In an exemplary embodiment, a second end 1446 of distal rod 144 may be configured to be inserted and secured into a distal medullary cavity 1544 of distal fragment 154. In an exemplary embodiment, an outer diameter of second end 1446 of distal rod 144 may correspond to an inner diameter of distal medullary cavity 1544 of distal fragment 152 so that when second end 1446 of distal rod 144 is inserted into distal medullary cavity 1544 of distal fragment 154, distal rod 144 may be secured into distal medullary cavity 1544 of distal fragment 154. In an exemplary embodiment, distal rod 144 may be a cannulated screw. In an exemplary embodiment, distal rod 144 may be configured to be coaxially inserted and secured into distal medullary cavity 1544 of distal fragment 154. In an exemplary embodiment, an exemplary surgeon may first insert second end 1446 of distal rod 144 into distal medullary cavity 1544 of distal fragment 154 and then attach first end 1444 of distal rod 144 to distal end 1424 of distal arm 142. In an exemplary embodiment, distal rod 144 may be detachably attached to distal end 1424 of distal arm 142. In an exemplary embodiment, distal arm 142 may include a distal rod receiving hole 1428 at distal end 1424 of distal arm 142. In an exemplary embodiment, a main longitudinal axis 1429 of distal rod receiving hole 1428 may be perpendicular to main longitudinal axis 1422 of distal arm 142. In an exemplary embodiment, distal rod receiving hole 1428 may be configured to receive first end 1444 of distal rod 144.

In an exemplary embodiment, distal traction arm 146 may be configured to be fixedly attached and secured to distal fragment 154 of fractured femur 105. In an exemplary embodiment, distal traction arm 146 may be fixedly attached and secured to distal fragment 154 of fractured femur 105 by utilizing a second pair of connecting screws 143. In an exemplary embodiment, second pair of connecting screws 143 may be screwed into the lateral cortex of distal fragment 154 of fractured femur 105. In an exemplary embodiment, second pair of connecting screws 143 may include a third connecting screw 1432 and a fourth connecting screw 1434. In an exemplary embodiment, third connecting screw 1432 may be inserted into a third connecting hole on distal traction arm 146 and then screwed into distal fragment 154. In an exemplary embodiment, fourth connecting screw 1234 may be inserted into a fourth connecting hole on distal traction arm 146 and then screwed into distal fragment 154. In an exemplary embodiment, second pair of connecting screws 143 may be screwed into the lateral cortex of distal fragment 154 of fractured femur 105 in such a way that a main longitudinal axis of third connecting screw 1432 and a main longitudinal axis of fourth connecting screw 1434 lies inside coronal plane 506 of the patient.

In an exemplary embodiment, a main longitudinal axis 1462 of distal traction arm 146 may be parallel to main longitudinal axis 1442 of distal rod 144. In an exemplary embodiment, a first distance 1240 between main longitudinal axis 1242 of proximal rod 124 and main longitudinal axis 1262 of proximal traction arm 126 may be equal to a second distance 1440 between main longitudinal axis 1442 of distal rod 144 and main longitudinal axis 1462 of distal traction arm 146. In an exemplary embodiment, it may be understood that when first distance 1240 between main longitudinal axis 1242 of proximal rod 124 and main longitudinal axis 1262 of proximal traction arm 126 is equal to second distance 1440 between main longitudinal axis 1442 of distal rod 144 and main longitudinal axis 1462 of distal traction arm 146, proximal rod 124 and distal rod 144 may urge proximal fragment 152 and distal fragment 154 to be aligned with each other. In an exemplary embodiment, a proximal end 1466 of distal traction arm 146 may be attached to a proximal end 1426 of distal arm 142.

In an exemplary embodiment, distal traction arm 146 may include an externally threaded section 1463 on an outer surface of distal traction arm 146 and at a distal end 1464 of distal traction arm 146. In an exemplary embodiment, distal end 1464 of distal traction arm 146 may be configured to be inserted into rod receiving hole 1263. In an exemplary embodiment, an outer diameter of distal end 1464 of distal traction arm 146 may correspond to an inner diameter of rod receiving hole 1263. In an exemplary embodiment, distal traction arm 146 and rod receiving hole 1263 may be configured to align main longitudinal axis 1462 of distal traction arm 146 with the main longitudinal axis of rod receiving hole 1263 responsive to inserting distal end 1464 of distal traction arm 146 into rod receiving hole 1263.

Referring back to FIG. 2A, in an exemplary embodiment, a proximal end 1486 of distal alignment arm 148 may be attached to proximal end 1426 of distal arm 142 and proximal end 1466 of distal traction arm 146. In an exemplary embodiment, a main longitudinal axis 1482 of distal alignment arm 148 may be perpendicular to main longitudinal axis 1422 of distal arm 142 and main longitudinal axis 1462 of distal traction arm 146. In an exemplary embodiment, distal alignment arm 148 may include a distal alignment hole 1483 at a distal end 1484 of distal alignment arm 148. In an exemplary embodiment, distal alignment hole 1483 may include a polygonal cross-section. In an exemplary embodiment, distal alignment hole 1483 may include a triangular cross-section. In an exemplary embodiment, a shape of distal alignment hole 1483 may correspond to a shape of proximal alignment hole 1283. In an exemplary embodiment, a size of distal alignment hole 1483 may correspond to a size of proximal alignment hole 1283.

Referring back to FIG. 2, in an exemplary embodiment, length adjusting nut 106 may be mounted onto distal end 1264 of proximal traction arm 126. In an exemplary embodiment, length adjusting nut 106 may include an internally threaded section. In an exemplary embodiment, the internally threaded section of length adjusting nut 106 may be configured to be engaged with externally threaded section 1463. In an exemplary embodiment, when length adjusting nut 106 is twisted in a first rotational direction, length adjusting nut 106 may urge distal traction arm 146 to move into rod receiving hole 1263. In an exemplary embodiment, the first rotational direction may refer to a clockwise direction. In an exemplary embodiment, when length adjusting nut 106 is twisted in a second rotational direction, length adjusting nut 106 may urge distal traction arm 146 to move out of rod receiving hole 1263. In an exemplary embodiment, the second rotational direction may refer to a counterclockwise direction.

In an exemplary embodiment, when distal traction arm 146 moves into rod receiving hole 1263, a third distance 132 between main longitudinal axis 1222 of proximal arm 122 and main longitudinal axis 1422 of distal arm 142 may decrease. In an exemplary embodiment, when distal traction arm 146 moves out of rod receiving hole 1263, third distance 132 between main longitudinal axis 1222 of proximal arm 122 and main longitudinal axis 1422 of distal arm 142 may increase. Consequently, in an exemplary embodiment, an exemplary surgeon may be able to adjust a distance between proximal fragment 152 and distal fragment 154 by twisting length adjusting nut 106 in a clockwise and/or counterclockwise direction. For example, an exemplary surgeon may measure a distance between two ends of a femur bone of the other thigh of the patient and then adjust third distance 132 in such a way that a distance between two ends of fractured femur 105 of the patient becomes equal to the distance between two ends of the femur bone of the other thigh of the patient. In an exemplary embodiment, an exemplary surgeon may utilize scanogram radiology to measure a distance between two ends of a femur bone of the other thigh of the patient. However, in an exemplary embodiment, an exemplary surgeon may adjust third distance 132 in such a way that the distance between two ends of fractured femur 105 of the patient becomes a little less/more than the distance between two ends of the femur bone of the other thigh of the patient.

In an exemplary embodiment, a first end 182 of alignment rod 108 may be configured to be inserted into proximal alignment hole 1283. In an exemplary embodiment, a second end 184 of alignment rod 108 may be configured to be inserted into distal alignment hole 1483. In an exemplary embodiment, a cross-section of alignment rod 108 may include a triangular shape. In an exemplary embodiment, a shape of alignment rod 108 may correspond to the shape of proximal alignment hole 1283 and the shape of distal alignment hole 1483. In an exemplary embodiment, a size of alignment rod 108 may correspond to the size of proximal alignment hole 1283 and the size of distal alignment hole 1483. In an exemplary embodiment, it may be understood that when alignment rod 108 is inserted into proximal alignment hole 1283 and distal alignment hole 1483, main longitudinal axis 1282 of proximal alignment arm 128 and main longitudinal axis 1482 of distal alignment arm 148 may be parallel to each other.

In an exemplary embodiment, an exemplary surgeon may insert proximal rod 124 into proximal medullary cavity 1524 of proximal fragment 152 and insert distal rod 144 into distal medullary cavity 1544 of distal fragment 154. Then, an exemplary surgeon may insert distal end 1464 of distal traction arm 146 into rod receiving hole 1263. Then, an exemplary surgeon may adjust a distance between a head of proximal fragment 152 and a head of distal fragment 154 by twisting length adjusting nut 106 in a clockwise and/or counterclockwise direction. Then, an exemplary surgeon may insert alignment rod 108 into proximal alignment hole 1283 and distal alignment hole 1483. After that, an exemplary surgeon may insert first pair of connecting screws 123 into proximal traction arm 126 and then screw them into proximal fragment 152. In an exemplary embodiment, an exemplary surgeon may screw first pair of connecting screws 123 into the lateral cortex of proximal fragment 152. An exemplary surgeon may also insert second pair of connecting screws 143 into distal traction arm 146 and then screw them into distal fragment 154. In an exemplary embodiment, second pair of connecting screws 143 may be screwed into the lateral cortex of distal fragment 154. In an exemplary embodiment, second pair of connecting screws 143 may be screwed into the lateral cortex of distal fragment 154 of fractured femur 105 in such a way that a main longitudinal axis of third connecting screw 1432 and a main longitudinal axis of fourth connecting screw 1434 lies inside coronal plane 506 of the patient. In an exemplary embodiment, it may be understood that when the main longitudinal axis of third connecting screw 1432 and the main longitudinal axis of fourth connecting screw 1434 lies inside coronal plane 506 of the patient, the main longitudinal axis of third connecting screw 1432 and the main longitudinal axis of fourth connecting screw 1434 may be parallel with main longitudinal axis 1222 of proximal arm 122. In an exemplary embodiment, it may be understood that in this arrangement, proximal fragment 152 and distal fragment 154 may restore their alignment and orientation to a pre-fracture state. In this situation, an exemplary surgeon may insert a guide into the bone canal without resorting to traction bed, radiography, and X-ray methods. In an exemplary embodiment, proximal traction arm 126 and distal traction arm 146 may be equipped with an accurate ruler. In an exemplary embodiment, after inserting a guide into the bone canal, an exemplary surgeon may adjust a length of fractured femur 105 of the patient to become exactly equal to a length of the femur bone of the other thigh of an exemplary patient.

In an exemplary embodiment, it may be understood that in an example of a femur fracture, proximal fragment 152 and distal fragment 154 may be shortened in relation to one another due to overlapping of proximal fragment 152 and distal fragment 154. In an exemplary embodiment, shortening may refer to the number of centimeters of overlap. In an exemplary embodiment, proximal fragment 152 and distal fragment 154 may further lose their alignment which may mean that an axis of proximal fragment 152 and distal fragment 154 are not parallel to one another. Furthermore, in an exemplary embodiment, a rotation may happen between proximal fragment 152 and distal fragment 154. Therefore, in an exemplary embodiment, a deformity after a femur fracture may have an overriding component, an angulating component, and a rotating component. In an exemplary embodiment, by utilizing reduction and fixation device 100, an exemplary surgeon may be able to correct the overriding component, the angulating component, and the rotating component of the deformity and restore the orientation and alignment of proximal fragment 152 and distal fragment 154 without utilizing a fluoroscopy set and without exposing the patient and the staff to x-ray.

Figure 4:
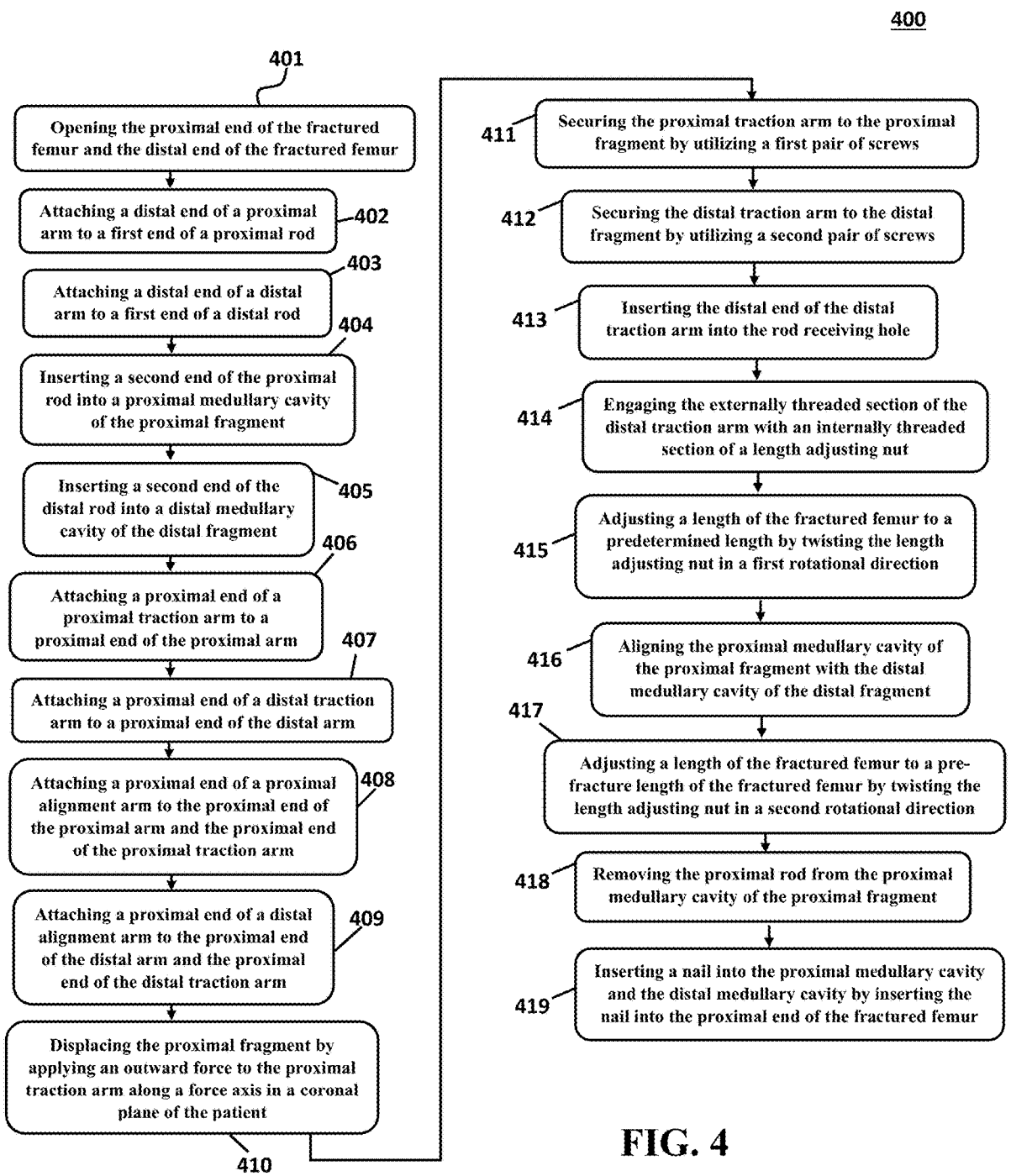
FIG. 4 illustrates a flowchart of a method for fracture reduction in a fractured femur of an exemplary patient, consistent with one or more exemplary embodiments of the present disclosure.

FIG. 4 shows a flowchart of a method 400 for fracture reduction in a fractured femur of a patient, consistent with one or more exemplary embodiments of the present disclosure. As shown in FIG. 4, an exemplary method 400 may include opening the proximal end of the fractured femur and the distal end of the fractured femur (step 401), attaching a distal end of a proximal arm to a first end of a proximal rod (step 402), attaching a distal end of a distal arm to a first end of a distal rod (step 403), inserting a second end of the proximal rod into a proximal medullary cavity of the proximal fragment (step 404), inserting a second end of the distal rod into a distal medullary cavity of the distal fragment (step 405), attaching a proximal end of a proximal traction arm to a proximal end of the proximal arm (step 406), attaching a proximal end of a distal traction arm to a proximal end of the distal arm (step 407), attaching a proximal end of a proximal alignment arm to the proximal end of the proximal arm and the proximal end of the proximal traction arm (step 408), attaching a proximal end of a distal alignment arm to the proximal end of the distal arm and the proximal end of the distal traction arm (step 409), displacing the proximal fragment to a pre-fracture state of the proximal fragment by applying an outward force to the proximal traction arm along a force axis (step 410), securing the proximal traction arm to the proximal fragment by utilizing a first pair of screws (step 411), securing the distal traction arm to the distal fragment by utilizing a second pair of screws (step 412), inserting the distal end of the distal traction arm into the rod receiving hole (step 413), engaging the externally threaded section of the distal traction arm with an internally threaded section of a length adjusting nut (step 414), adjusting a length of the fractured femur to a predetermined length by twisting the length adjusting nut in a first rotational direction (step 415), aligning the proximal medullary cavity of the proximal fragment with the distal medullary cavity of the distal fragment (step 416), adjusting a length of the fractured femur to a pre-fracture length of the fractured femur by twisting the length adjusting nut in a second rotational direction (step 417), removing the proximal rod from the proximal medullary cavity of the proximal fragment (step 418), and inserting a nail into the proximal medullary cavity and the distal medullary cavity by inserting the nail into the proximal end of the fractured femur(step 419).

Below steps of method 400 are described below in the context of exemplary elements shown in FIGS. 1A, 1B, 2A, 2B, and 3. In an exemplary embodiment, step 401 of method 400 may include opening a proximal end 1522 of fractured femur 105 and a distal end 1542 of fractured femur 105. In an exemplary embodiment, an exemplary surgeon may open proximal end 1522 of fractured femur 105 and distal end 1542 of fractured femur 105 by utilizing an awl and/or a starting reamer. In an exemplary embodiment, step 402 of method 400 may include attaching distal end 1224 of proximal arm 122 to first end 1244 of proximal rod 124. In an exemplary embodiment, distal end 1224 of proximal arm 122 may be attached to first end 1244 of proximal rod 124 in such a way that main longitudinal axis 1242 of proximal rod 124 is perpendicular to main longitudinal axis 1222 of proximal arm 122. In an exemplary embodiment, distal end 1224 of proximal arm 122 may be attached detachably to first end 1244 of proximal rod 124 so that an exemplary surgeon is able to detach proximal rod 124 from proximal arm 122 easily. In an exemplary embodiment, a hole may be provided in first end 1244 of proximal rod 124 and distal end 1224 of proximal arm 122 may be inserted into the hole so that an exemplary surgeon may be able to detach proximal rod 124 from proximal arm 122 by easily removing distal end 1224 of proximal arm 122 from the hole. In an exemplary embodiment, step 403 of method 400 may include attaching distal end 1424 of distal arm 142 to first end 1444 of distal rod 144. In an exemplary embodiment, distal end 1424 of distal arm 142 may be attached to first end 1444 of distal rod 144 in such a way that main longitudinal axis 1442 of distal rod 144 is perpendicular to main longitudinal axis 1422 of distal arm 142. In an exemplary embodiment, distal end 1424 of distal arm 142 may be attached detachably to first end 1444 of distal rod 144 so that an exemplary surgeon is able to detach distal rod 144 from distal arm 142 easily.

In an exemplary embodiment, step 404 of method 400 may include inserting second end 1246 of proximal rod 124 into proximal medullary cavity 1524 of proximal fragment 152. In an exemplary embodiment, a diameter of proximal rod 124 may be adjusted to fit in proximal medullary cavity 1524 of proximal fragment 152. In an exemplary embodiment, step 405 of method 400 may include inserting second end 1446 of distal rod 144 into distal medullary cavity 1544 of distal fragment 154.

In an exemplary embodiment, step 406 of method 400 may include attaching proximal end 1266 of proximal traction arm 126 to proximal end 1226 of proximal arm 122. In an exemplary embodiment, proximal end 1266 of proximal traction arm 126 may be attached to proximal end 1226 of proximal arm 122 in such a way that main longitudinal axis 1262 of proximal traction arm 126 is parallel to main longitudinal axis 1242 of proximal rod 124 and also main longitudinal axis 1262 of proximal traction arm 126 is perpendicular to main longitudinal axis 1222 of proximal arm 122. In an exemplary embodiment, step 407 of method 400 may include attaching proximal end 1466 of distal traction arm 146 to proximal end 1426 of distal arm 142. In an exemplary embodiment, proximal end 1466 of distal traction arm 146 may be attached to proximal end 1426 of distal arm 142 in such a way that main longitudinal axis 1462 of distal traction arm 146 is parallel to main longitudinal axis 1442 of distal rod 144 and also main longitudinal axis 1462 of distal traction arm 146 is perpendicular to main longitudinal axis 1422 of distal arm 142.

In an exemplary embodiment, step 408 of method 400 may include attaching proximal end 1286 of proximal alignment arm 128 to proximal end 1226 of proximal arm 122 and proximal end 1266 of proximal traction arm 126. In an exemplary embodiment, proximal end 1286 of proximal alignment arm 128 may be attached to proximal end 1226 of proximal arm 122 and proximal end 1266 of proximal traction arm 126 in such a way that main longitudinal axis 1282 of proximal alignment arm 128 may be perpendicular to main longitudinal axis 1222 of proximal arm 122 and main longitudinal axis 1262 of proximal traction arm 126. In an exemplary embodiment, step 409 of method 400 may include attaching proximal end 1486 of distal alignment arm 148 to proximal end 1426 of distal arm 142 and proximal end 1466 of distal traction arm 146. In an exemplary embodiment, proximal end 1486 of distal alignment arm 148 may be attached to proximal end 1426 of distal arm 142 and proximal end 1466 of distal traction arm 146 in such a way that main longitudinal axis 1482 of distal alignment arm 148 may be perpendicular to main longitudinal axis 1422 of distal arm 142 and main longitudinal axis 1462 of distal traction arm 146.

Figure 5:
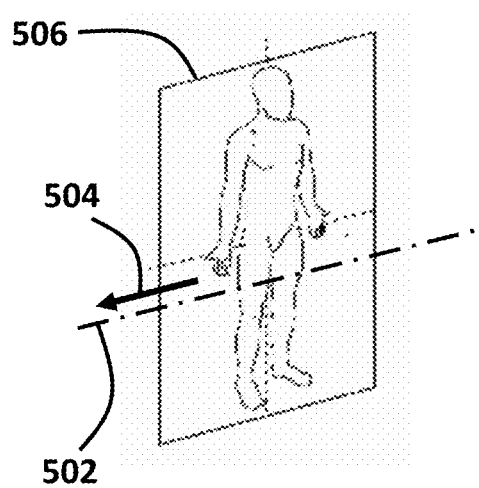
FIG. 5 illustrates an exemplary patient and his/her coronal plane, consistent with one or more exemplary embodiments of the present disclosure.

In an exemplary embodiment, step 410 of method 400 may include applying an outward force to proximal traction arm 126 along a force axis. FIG. 5 shows an exemplary patient and his/her coronal plane, consistent with one or more exemplary embodiments of the present disclosure. As shown in FIG. 5, an exemplary surgeon may apply an outward force to proximal traction arm 126 along a force axis such as force axis 502. In an exemplary embodiment, force axis 502 may lie inside a coronal plane 506 of an exemplary patient. In an exemplary embodiment, an exemplary surgeon may apply an outward force to proximal traction arm 126 in a direction 504. In an exemplary embodiment, after implementing step 410, a femur neck 1523 of proximal fragment 152 may be aligned with proximal arm 122. In an exemplary embodiment, at this point, proximal fragment 152 of fractured femur 105 may be oriented at about 15° internal rotation. In an exemplary embodiment, proximal arm 122 may be displaced by about 15° in external rotation and then and then proximal traction arm 126 may be screwed to lateral cortex of proximal fragment 152 of fractured femur 105 and distal fragment 154 of fractured femur 105 may be disposed in coronal plane 506 of the patient and in this way the fracture rotation may be controlled. In an exemplary embodiment, step 411 of method 400 may include attaching proximal traction arm 126 to proximal fragment 152 of fractured femur 105 by utilizing a first pair of connecting screws 123. In an exemplary embodiment, step 412 of method 400 may include attaching distal traction arm 146 to distal fragment 154 of fractured femur 105 by utilizing a second pair of connecting screws 143. In an exemplary embodiment, second pair of connecting screws 143 may be screwed into the lateral cortex of distal fragment 154 of fractured femur 105. In an exemplary embodiment, second pair of connecting screws 143 may be screwed into the lateral cortex of distal fragment 154 of fractured femur 105 in such a way that a main longitudinal axis of third connecting screw 1432 and a main longitudinal axis of fourth connecting screw 1434 lies inside coronal plane 506 of the patient.

In an exemplary embodiment, step 413 of method 400 may include inserting distal end 1464 of distal traction arm 146 inside rod receiving hole 1263. In an exemplary embodiment, step 414 of method 400 may include engaging externally threaded section 1463 with the internally threaded section of length adjusting nut 106. In an exemplary embodiment, step 415 of method 400 may include twisting length adjusting nut 106 in a counterclockwise direction in order to adjust a length of fractured femur 105 to a predetermined length. In an exemplary embodiment, the predetermined length may be 1 cm or 2 cm greater than a pre-fracture length of fractured femur 105. In an exemplary embodiment, distal traction arm 146 may be a graduated rod. Hence, an exemplary surgeon may easily adjust the length of fractured femur 105 to a desired length. In an exemplary embodiment, an exemplary surgeon may obtain the pre-fracture length of fractured femur 105 by measuring a length of a femur bone of the other thigh by utilizing scanogram radiology.

In an exemplary embodiment, step 416 of method 400 may include inserting first end 182 of alignment rod 108 into proximal alignment hole 1283 of proximal alignment arm 128 and insert second end 184 of alignment rod 108 into distal alignment hole 1483 of distal alignment arm 148. In an exemplary embodiment, when alignment rod 108 is inserted into proximal alignment hole 1283 of proximal alignment arm 128 and distal alignment hole 1483 of distal alignment arm 148, proximal medullary cavity 1524 of proximal fragment 152 may be aligned with distal medullary cavity 1544 of distal fragment 154. In an exemplary embodiment, by utilizing alignment rod 108, an exemplary surgeon may be able to align proximal medullary cavity 1524 of proximal fragment 152 with distal medullary cavity 1544 of distal fragment 154 with a need to a fluoroscopy set and exposure of the patient and the staff to X-ray radiation.

In an exemplary embodiment, step 417 of method 400 may include twisting length adjusting nut 106 in a clockwise direction in order to adjust the length of fractured femur 105 to a pre-fracture length of fractured femur 105. In an exemplary embodiment, step 418 of method 400 may include removing proximal rod 124 from proximal medullary cavity 1524 of proximal fragment 152. In an exemplary embodiment step 419 of method 400 may include inserting a nail into proximal medullary cavity 1524 of proximal fragment 152 and distal medullary cavity 1544 of distal fragment 154 by inserting the nail into proximal end 1522 of fractured femur 105. In an exemplary embodiment, step 418 may include removing distal rod 144 from distal medullary cavity 1544 of distal fragment 154. In an exemplary embodiment, step 419 may include inserting a nail into proximal medullary cavity 1524 of proximal fragment 152 and distal medullary cavity 1544 of distal fragment 154 by inserting the nail into distal end 1542 of fractured femur 105.

Figure 6A:
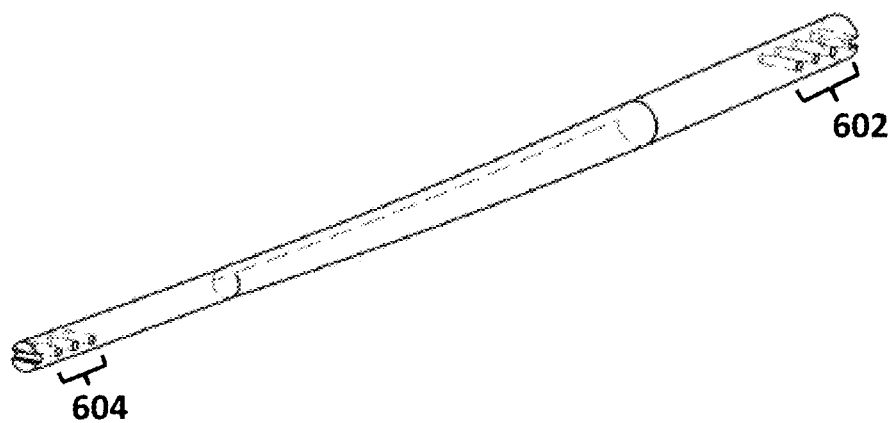
FIG. 6A illustrates a perspective view of an intramedullary nail, consistent with one or more exemplary embodiments of the present disclosure.
Figure 6B:
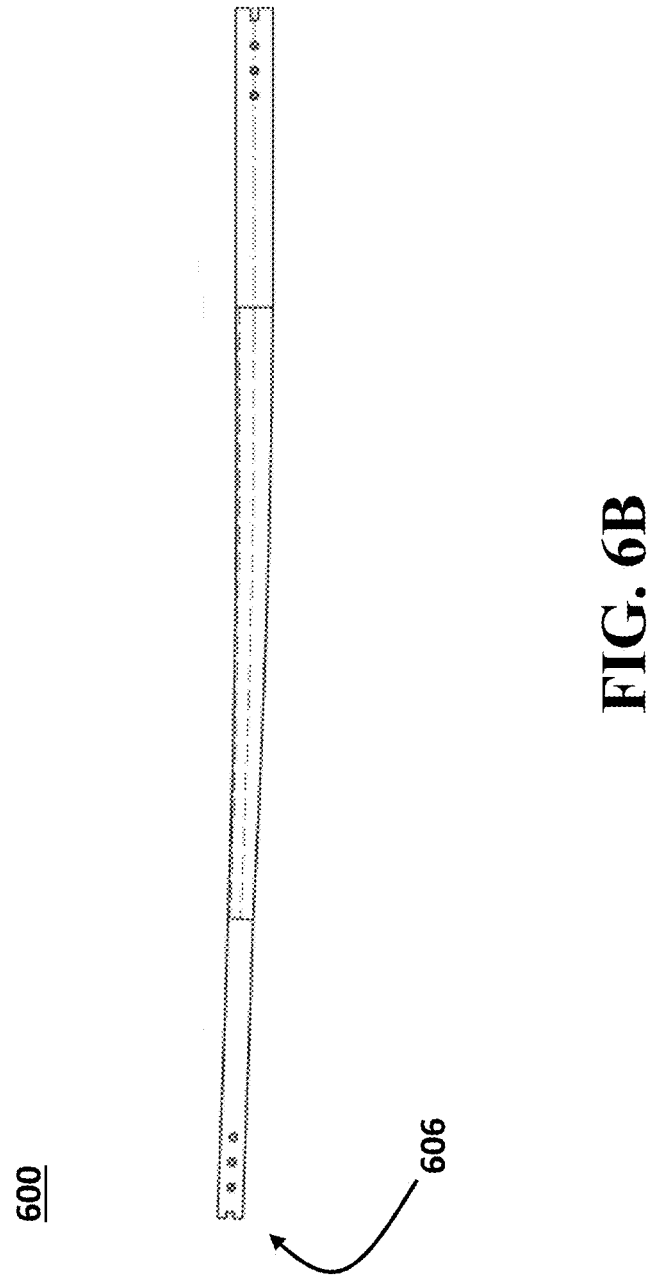
FIG. 6B illustrates a side view of an intramedullary nail, consistent with one or more exemplary embodiments of the present disclosure.
Figure 6C:
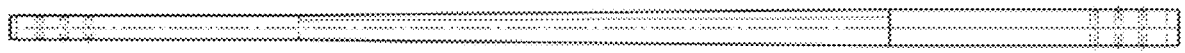
FIG. 6C illustrates a top view of an intramedullary nail, consistent with one or more exemplary embodiments of the present disclosure.
Figure 6D:
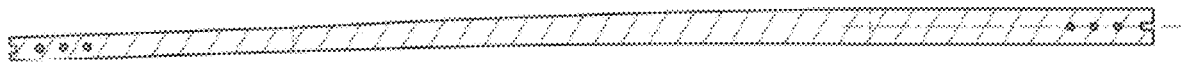
FIG. 6D illustrates a section view of an intramedullary nail, consistent with one or more exemplary embodiments of the present disclosure.

FIG. 6A shows a perspective view of an intramedullary nail 600, consistent with one or more exemplary embodiments of the present disclosure. FIG. 6B shows a side view of intramedullary nail 600, consistent with one or more exemplary embodiments of the present disclosure. FIG. 6C shows a top view of intramedullary nail 600, consistent with one or more exemplary embodiments of the present disclosure. FIG. 6D shows a section view of intramedullary nail 600, consistent with one or more exemplary embodiments of the present disclosure. In an exemplary embodiment, an exemplary surgeon may use a nail such as exemplary intramedullary nail 600 in implementing step 419 of method 400. In an exemplary embodiment, it may be understood that by utilizing method 400, an exemplary surgeon may be able to use a solid nail as intramedullary nail 600 and consequently, intramedullary nail 600 may have higher mechanical strength and endurance. Furthermore, an exemplary surgeon may be able to use screws with greater diameters as interlock screws and consequently, the assembly of intramedullary nail 600 and interlock screws may have higher mechanical strength and endurance. In an exemplary embodiment, as discussed above, intramedullary nail 600 and interlock screws may be able to bear an exemplary patient's weight during walking more reliably with a very low possibility of fracture in intramedullary nail 600 and/or interlock screws.

Figure 7:
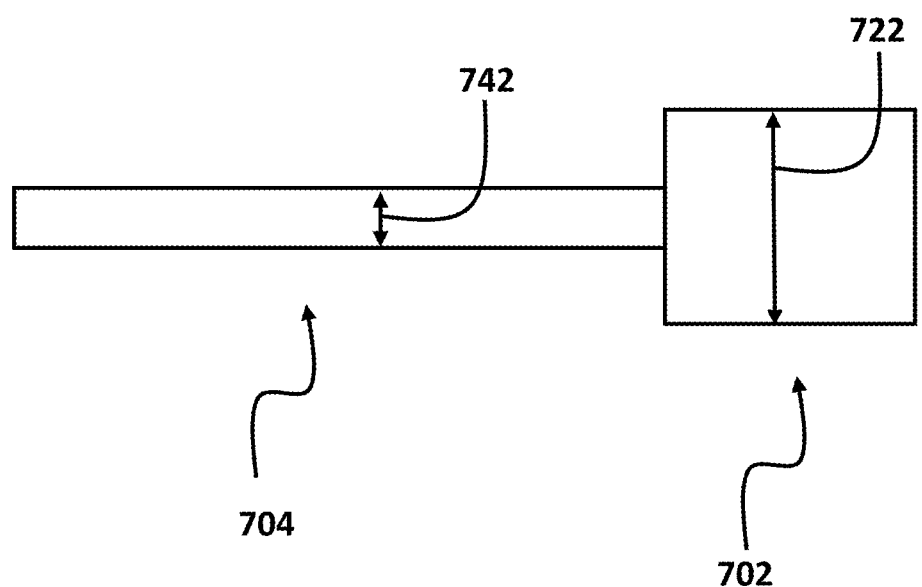
FIG. 7 illustrates a stepped nail consistent with one or more exemplary embodiments of the present disclosure.

In an exemplary embodiment, an exemplary surgeon may use a stepped nail as intramedullary nail 600 in implementing step 419 of method 400. In an exemplary embodiment, a stepped nail may refer to a nail that has two parts with different diameters. FIG. 7 shows a side view of a stepped nail 700 consistent with one or more exemplary embodiments of the present disclosure. As shown in FIG. 7, in an exemplary embodiment, stepped nail 700 may include a proximal part 702 with a greater diameter and a distal part 704 with a smaller diameter. For example, a diameter 722 of proximal part 702 may be about 16 mm and a diameter 742 of distal part 704 may be approximately 11 mm. For purpose of reference, it may be understood that diameter 742 of distal part 704 may be limited by a smallest inner diameter of the fractured femur. In an exemplary embodiment, utilizing stepped nail 700 may provide some benefits. For example, when stepped nail 700 is used as intramedullary nail 600, larger screws that have more strength may be screwed into proximal part 702 due to its greater diameter.

Figure 8A:
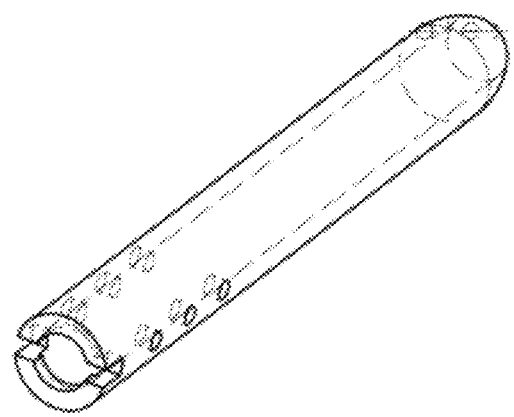
FIG. 8A illustrates a perspective view of a bushing tube, consistent with one or more exemplary embodiments of the present disclosure.
Figure 8B:
FIG. 8B illustrates a side view of a bushing tube, consistent with one or more exemplary embodiments of the present disclosure.
Figure 8C:
FIG. 8C illustrates a top view of a bushing tube, consistent with one or more exemplary embodiments of the present disclosure.
Figure 8D:
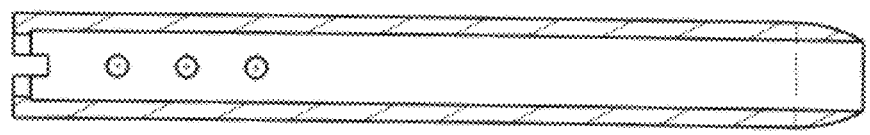
FIG. 8D illustrates a section view of a bushing tube, consistent with one or more exemplary embodiments of the present disclosure.

FIG. 8A shows a perspective view of bushing tube 800, consistent with one or more exemplary embodiments of the present disclosure. FIG. 8B shows a side view of bushing tube 800, consistent with one or more exemplary embodiments of the present disclosure. FIG. 8C shows a top view of bushing tube 800, consistent with one or more exemplary embodiments of the present disclosure. FIG. 8D shows a section view of bushing tube 800, consistent with one or more exemplary embodiments of the present disclosure. In an exemplary embodiment, after inserting the nail into proximal medullary cavity 1524 of proximal fragment 152 and distal medullary cavity 1544 of distal fragment 154, an exemplary surgeon may mount a bushing tube such as bushing tube 800 onto a distal end 606 of intramedullary nail 600 by inserting bushing tube 800 into distal medullary cavity 1544 of distal fragment 154. In an exemplary embodiment, it may be understood that when an exemplary surgeon, utilizes method 400 for fracture reduction in a fractured femur of an exemplary patient, the thigh of an exemplary patient and the leg of an exemplary patient is not required to be aligned with each other. Consequently, when an exemplary surgeon is implementing step 419 of method 400, an exemplary surgeon may easily open the knee of an exemplary patient and insert bushing tube 800 into distal medullary cavity 1544 of distal fragment 154. In an exemplary embodiment, an outer diameter of bushing tube 800 may correspond to an inner diameter of distal medullary cavity 1544 of distal fragment 154. In an exemplary embodiment, an inner diameter of bushing tube 800 may correspond to the diameter of distal end 606 of intramedullary nail 600. In an exemplary embodiment, it may be understood that utilizing bushing tube 800 may help intramedullary nail 600 to bear higher weights without fracture. Furthermore, utilizing bushing tube 800 may provide a facility for the surgeon to use screws with greater diameters as interlock screws and consequently, mechanical strength and endurance of intramedullary nail 600 may be increased.

Figure 9A:
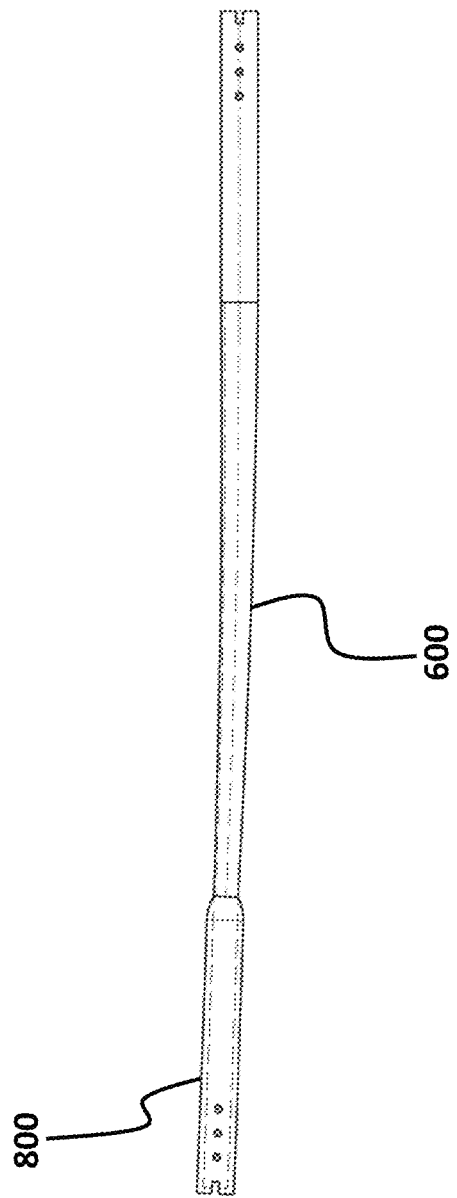
FIG. 9A illustrates a side view of a bushing tube in a scenario in which the bushing tube is mounted onto a distal end of an intramedullary nail, consistent with one or more exemplary embodiments of the present disclosure.
Figure 9B:
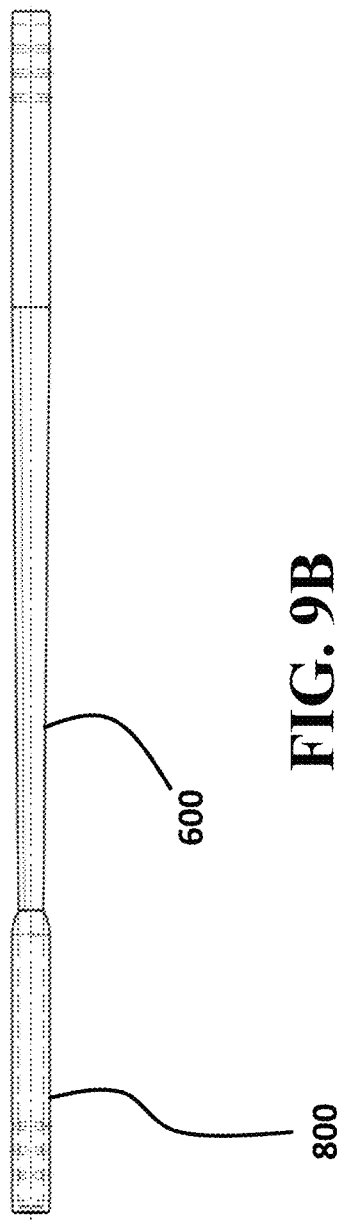
FIG. 9B illustrates a top view of a bushing tube in a scenario in which the bushing tube is mounted onto a distal end of an intramedullary nail, consistent with one or more exemplary embodiments of the present disclosure.
Figure 9C:
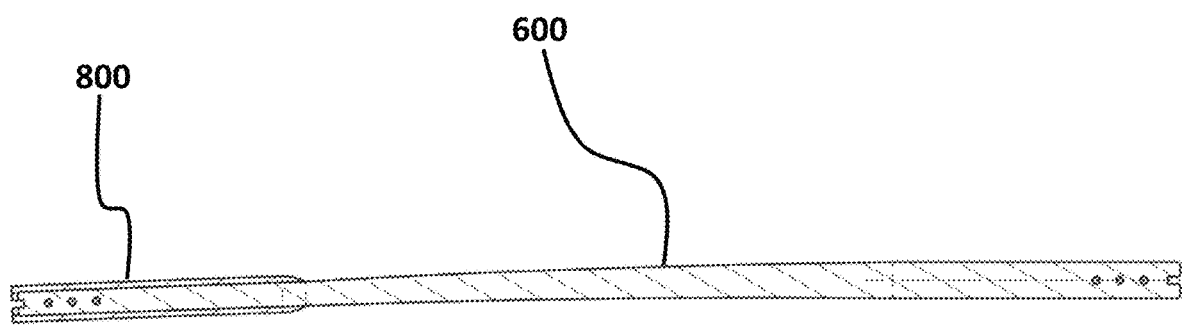
FIG. 9C illustrates a section view of a bushing tube in a scenario in which the bushing tube is mounted onto a distal end of an intramedullary nail, consistent with one or more exemplary embodiments of the present disclosure.

FIG. 9A shows a side view of bushing tube 800 in a scenario in which bushing tube 800 is mounted onto distal end 606 of intramedullary nail 600, consistent with one or more exemplary embodiments of the present disclosure. FIG. 9B shows a top view of bushing tube 800 in a scenario in which bushing tube 800 is mounted onto distal end 606 of intramedullary nail 600, consistent with one or more exemplary embodiments of the present disclosure. FIG. 9C shows a section view of bushing tube 800 in a scenario in which bushing tube 800 is mounted onto distal end 606 of intramedullary nail 600, consistent with one or more exemplary embodiments of the present disclosure.

In an exemplary embodiment, an exemplary surgeon may then remove distal rod 144 from distal medullary cavity 1544 of distal fragment 154. Then, in an exemplary embodiment, the surgeon may detach proximal traction arm 126 from proximal fragment 152 by removing first pair of connecting screws 123. In an exemplary embodiment, the surgeon may also detach distal traction arm 146 from distal fragment 154 by removing second pair of connecting screws 143. In an exemplary embodiment, an exemplary surgeon may secure intramedullary nail 600 to proximal traction arm 126 by utilizing a first plurality of interlock screws. As shown in FIG. 6A, FIG. 6B, FIG. 6C, and FIG. 6D, in an exemplary embodiment, intramedullary nail 600 may include a first plurality of screw receiving holes 602. In an exemplary embodiment, first plurality of screw receiving holes 602 may be configured to receive the first plurality of interlock screws. In an exemplary embodiment, an exemplary surgeon may secure intramedullary nail 600 to distal traction arm 146 by utilizing a second plurality of interlock screws. As shown in FIG. 6A, FIG. 6B, FIG. 6C, and FIG. 6D, in an exemplary embodiment, intramedullary nail 600 may further include a second plurality of screw receiving holes 604. In an exemplary embodiment, second plurality of screw receiving holes 604 may be configured to receive the second plurality of interlock screws. In an exemplary embodiment, an exemplary surgeon may insert the first plurality of interlock screws and the second plurality of interlock screws into first plurality of screw receiving holes 602 and second plurality of screw receiving holes 604 without a need to a fluoroscopy set and exposure of the patient and the staff to X-ray radiation.

In an exemplary embodiment, each of proximal traction arm 126 and distal traction arm 156 may include a respective ruler. In an exemplary embodiment, proximal traction arm 126 and distal traction arm 156 may be scaled on an outer surface of them. In an exemplary embodiment, these rulers and scales may help the surgeon insert the first plurality of interlock screws and the second plurality of interlock screws into first plurality of screw receiving holes 602 and second plurality of screw receiving holes 604 without a need to a fluoroscopy set and exposure of the patient and the staff to X-ray radiation.

In an exemplary embodiment, by utilizing method 400, an exemplary surgeon may be able to correct the overriding component, the angulating component, and the rotating component of the deformity and restore the orientation and alignment of proximal fragment 152 and distal fragment 154 without utilizing a fluoroscopy set and without exposing the patient and the staff to x-ray.

While the foregoing has described what may be considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective spaces of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various implementations. This is for purposes of streamlining the disclosure, and is not to be interpreted as reflecting an intention that the claimed implementations require more features than are expressly recited in each claim. Rather, as the following claims reflect, inventive subject matter lies in less than all features of a single disclosed implementation. Thus, the following claims are hereby incorporated into the Detailed Description, with each claim standing on its own as a separately claimed subject matter.

While various implementations have been described, the description is intended to be exemplary, rather than limiting and it will be apparent to those of ordinary skill in the art that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

What is claimed is:

1. A reduction and fixation device for treating femoral shaft fracture, the reduction and fixation device comprising:
   a proximal trifurcation device configured to be attached and secured to a proximal fragment of a fractured femur of a patient, the proximal trifurcation device comprising:
      a proximal arm configured to be attached and secured to the proximal fragment of the fractured femur;
      a proximal rod comprising a first cannulated screw, a first end of the proximal rod attached to a distal end of the proximal arm, a main longitudinal axis of the proximal rod perpendicular to a main longitudinal axis of the proximal arm, a second end of the proximal rod configured to be inserted and secured into a proximal medullary cavity of the proximal fragment;
      a proximal traction arm configured to be fixedly attached and secured to the proximal fragment by utilizing a first pair of connecting screws, a main longitudinal axis of the proximal traction arm parallel to the main longitudinal axis of the proximal rod, a proximal end of the proximal traction arm attached to a proximal end of the proximal arm, the proximal traction arm comprising a rod receiving hole at a distal end of the proximal traction arm, a main longitudinal axis of the rod receiving hole corresponding to the main longitudinal axis of the proximal traction arm; and
      a proximal alignment arm, a proximal end of the proximal alignment arm attached to the proximal end of the proximal arm, the proximal end of the proximal alignment arm attached to the proximal end of the proximal traction arm, a main longitudinal axis of the proximal alignment arm perpendicular to the main longitudinal axis of the proximal rod, the main longitudinal axis of the proximal alignment arm perpendicular to the main longitudinal axis of the proximal traction arm, the proximal alignment arm comprising a proximal alignment hole at a distal end of the proximal alignment arm;
   a distal trifurcation device configured to be attached and secured to a distal fragment of the fractured femur of the patient, the distal trifurcation device comprising:
      a distal arm configured to be attached and secured to the distal fragment of the fractured femur;
      a distal rod comprising a second cannulated screw, a first end of the distal rod attached to a distal end of the distal arm, a main longitudinal axis of the distal rod perpendicular to a main longitudinal axis of the distal arm, a second end of the distal rod configured to be inserted and secured into a distal medullary cavity of the distal fragment;
      a distal traction arm associated with the proximal traction arm, the distal traction arm configured to be fixedly attached and secured to the distal fragment by utilizing a second pair of connecting screws, each respective main longitudinal axis of each screw from the second pair of connecting screws lies inside a coronal plane of the patient, a main longitudinal axis of the distal traction arm parallel to the main longitudinal axis of the distal rod, a proximal end of the distal traction arm attached to a proximal end of the distal arm, the distal traction arm comprising an externally threaded section on an outer surface of the distal traction arm and at a distal end of the distal traction arm, the distal end of the distal traction arm configured to be inserted into the rod receiving hole, an outer diameter of the distal traction arm corresponding to an inner diameter of the rod receiving hole, the distal traction arm and the rod receiving hole configured to align the main longitudinal axis of the distal traction arm with the main longitudinal axis of the rod receiving hole responsive to inserting the distal end of the distal traction arm into the rod receiving hole; and
      a distal alignment arm, a proximal end of the distal alignment arm attached to the proximal end of the distal arm, the proximal end of the distal alignment arm attached to the proximal end of the distal traction arm, a main longitudinal axis of the distal alignment arm perpendicular to the main longitudinal axis of the distal arm, the main longitudinal axis of the distal alignment arm perpendicular to the main longitudinal axis of the distal traction arm, the distal alignment arm comprising a distal alignment hole at a distal end of the distal alignment arm, the distal alignment hole associated with the proximal alignment hole;
   a length adjusting nut mounted onto the distal end of the proximal traction arm, the length adjusting nut associated with the externally threaded section, the length adjusting nut comprising an internally threaded section, the internally threaded section of the length adjusting nut configured to be engaged with the externally threaded section of the distal traction arm, the length adjusting nut configured to:
      urge the distal traction arm to move out from the rod receiving hole responsive to twisting the length adjusting nut in a first rotational direction; and
      urge the distal traction arm to move into the rod receiving hole responsive to twisting the length adjusting nut in a second rotational direction; and
   an alignment rod associated with the proximal alignment hole and the distal alignment hole, a first end of the alignment rod configured to be inserted into the proximal alignment hole, a second end of the alignment rod configured to be inserted into the distal alignment hole, the alignment rod configured to make the main longitudinal axis of the proximal alignment arm and the main longitudinal axis of the distal alignment arm parallel to each other responsive to the alignment rod being inserted into the proximal alignment hole and the distal alignment hole.

2. The reduction and fixation device of claim 1, wherein a first distance between the main longitudinal axis of the proximal rod and the main longitudinal axis of the proximal traction arm is equal to a second distance between the main longitudinal axis of the distal rod and the main longitudinal axis of the distal traction arm.

3. The reduction and fixation device of claim 2, wherein:
   a first cross-section of the proximal alignment hole comprises a first polygon;
   a second cross-section of the distal alignment hole comprises a second polygon;

a shape of the first polygon is the same as a shape of the second polygon; and a size of the first polygon is the same as a size of the second polygon.

4. The reduction and fixation device of claim 3, wherein:

a third cross-section of the alignment rod comprises a third polygon;

a shape of the third polygon is the same as the shape of the first polygon and the shape of the second polygon; and a size of the third polygon is the same as the size of the first polygon and the size of the second polygon.

5. The reduction and fixation device of claim 4, wherein:

a main longitudinal axis of the proximal alignment hole is parallel to the main longitudinal axis of the proximal traction arm; and a main longitudinal axis of the distal alignment hole is parallel to the main longitudinal axis of the distal traction arm.

6. The reduction and fixation device of claim 5, wherein each of the first polygon, the second polygon, and the third polygon comprises a triangular shape.

7. The reduction and fixation device of claim 6, wherein:

the first pair of connecting screws comprises a first connecting screw and a second connecting screw, the first connecting screw and the second connecting screw configured to fixedly attach and secure the proximal traction arm laterally to the proximal fragment; and the second pair of connecting screws comprises a third connecting screw and a fourth connecting screw, the third connecting screw and the fourth connecting screw configured to attach and secure the distal traction arm laterally to the distal fragment.

8. The reduction and fixation device of claim 7, further comprising:

a first connecting hole on the proximal traction arm, a main longitudinal axis of the first connecting hole parallel to the main longitudinal axis of the proximal arm, the first connecting hole configured to receive the first connecting screw, the first connecting screw configured to attach and secure the proximal traction arm laterally to the proximal fragment responsive to inserting the first connecting screw into the first connecting hole and screwing the first connecting screw to the proximal fragment;

a second connecting hole on the proximal traction arm, a main longitudinal axis of the second connecting hole parallel to the main longitudinal axis of the proximal arm, the second connecting hole configured to receive the second connecting screw, the second connecting screw configured to attach and secure the proximal traction arm laterally to the proximal fragment responsive to inserting the second connecting screw into the second connecting hole and screwing the second connecting screw to the proximal fragment;

a third connecting hole on the distal traction arm, a main longitudinal axis of the third connecting hole parallel to the main longitudinal axis of the distal arm, the third connecting hole configured to receive the third connecting screw, the third connecting screw configured to attach and secure the distal traction arm laterally to the distal fragment responsive to inserting the third connecting screw into the third connecting hole and screwing the third connecting screw to the distal fragment; and a fourth connecting hole on the distal traction arm, a main longitudinal axis of the fourth connecting hole parallel to the main longitudinal axis of the distal arm, the fourth connecting hole configured to receive the fourth connecting screw, the fourth connecting screw configured to attach and secure the distal traction arm laterally to the distal fragment responsive to inserting the fourth connecting screw into the fourth connecting hole and screwing the fourth connecting screw to the distal fragment.

9. The reduction and fixation device of claim 8, wherein:

the proximal rod is detachably attached to the distal end of the proximal arm, the proximal arm comprising a proximal rod receiving hole at the distal end of the proximal arm, a main longitudinal axis of the proximal rod receiving hole parallel to the main longitudinal axis of the proximal traction arm, the proximal rod receiving hole configured to receive the first end of the proximal rod;

the distal rod is detachably attached to the distal end of the distal arm, the distal arm comprising a distal rod receiving hole at the distal end of the distal arm, a main longitudinal axis of the distal rod receiving hole parallel to the main longitudinal axis of the distal traction arm, the distal rod receiving hole configured to receive the first end of the distal rod;

the proximal end of the proximal arm is detachably attached to the proximal end of the proximal traction arm and the proximal end of the proximal alignment arm; and the proximal end of the distal arm is detachable attached to the proximal end of the distal traction arm and the proximal end of the distal alignment arm.

* * * * *